Aug. 4, 1953     P. H. CONRADSON     2,647,346
GRINDER GAUGE
Filed Oct. 12, 1950     2 Sheets-Sheet 1
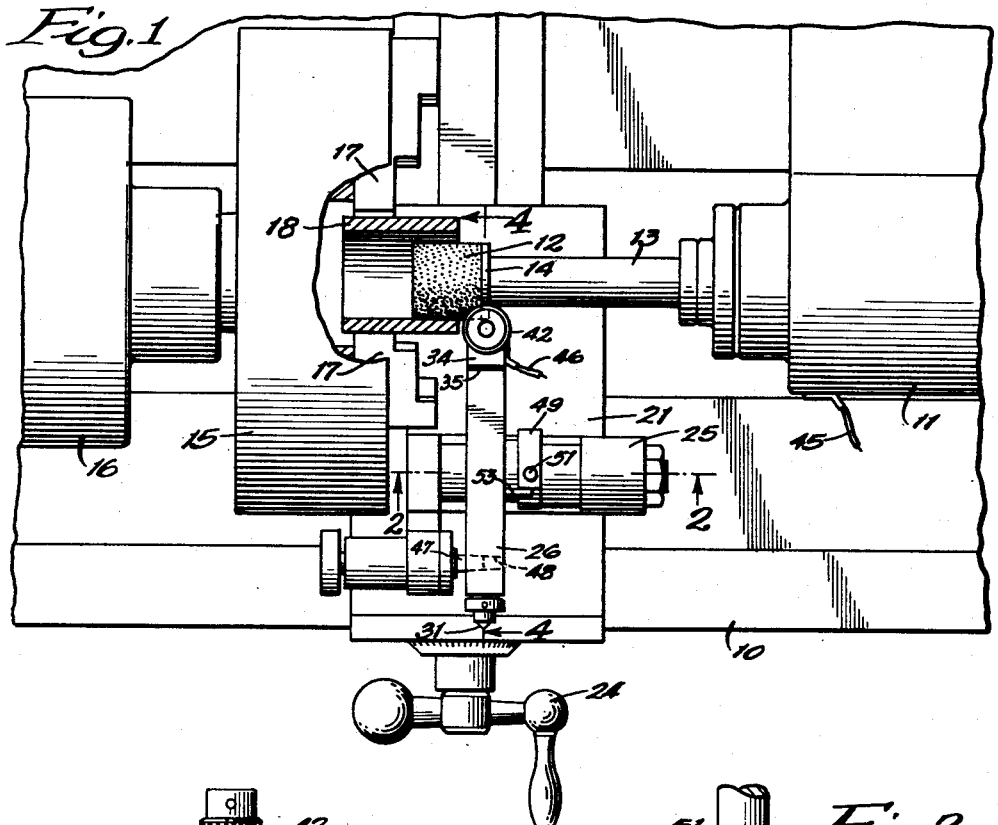
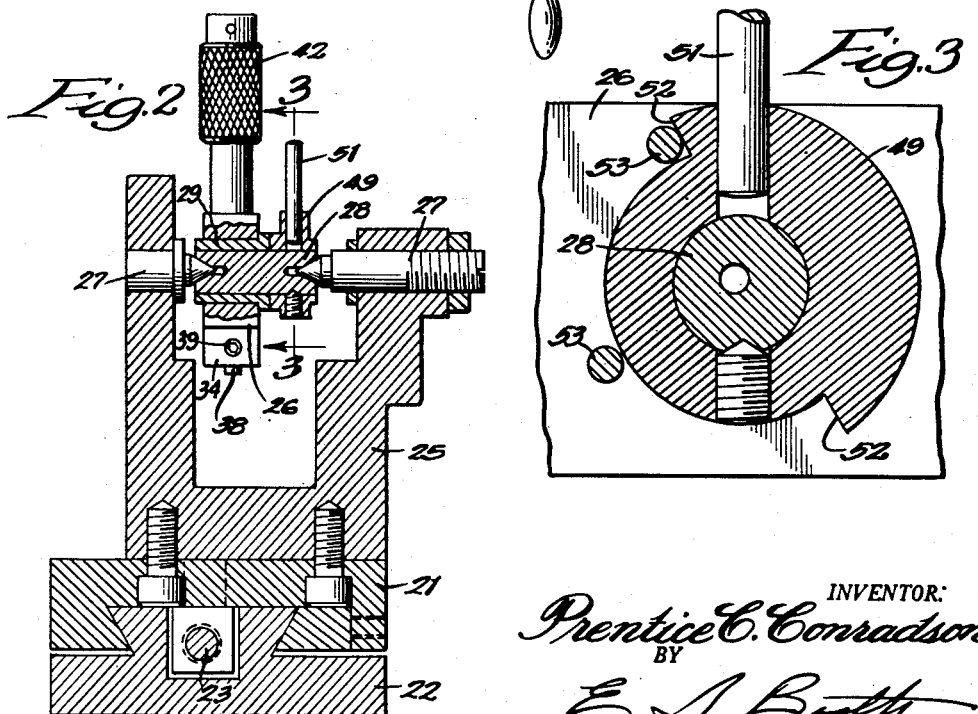
INVENTOR:
Prentice C. Conradson,
BY
E. S. Booth,
ATTORNEY.

Aug. 4, 1953   P. H. CONRADSON   2,647,346
GRINDER GAUGE
Filed Oct. 12, 1950   2 Sheets-Sheet 2

INVENTOR:
Prentice C. Conradson,
BY
ATTORNEY.

Patented Aug. 4, 1953

2,647,346

UNITED STATES PATENT OFFICE 2,647,346

GRINDER GAUGE

Prentice H. Conradson, Chicago, Ill., assignor of one-half to Thomas P. Slattery, Dearborn, Mich.

Application October 12, 1950, Serial No. 189,877

10 Claims. (Cl. 51—165)

1

This invention relates to grinder gages, and more particularly to gages for use with internal grinders to indicate electrically when the hole being ground is at the proper size.

In using internal grinders, especially where accurate results are required, it is necessary to stop the machine periodically and test the hole with gages. This involves not only stopping the machine, but also moving either the chuck or the grinder wheel so that a gage can be inserted in the hole, and is a very slow and time-consuming operation requiring numerous trials to avoid grinding the hole too large.

It is one of the objects of the present invention to provide a grinder gage which will indicate when the proper hole size has been reached without requiring stopping of the grinder.

Another object is to provide a grinder gage in which the indication is produced by closing an electric circuit with a conducting part of the grinder wheel. According to one feature, the grinder wheel carries a conducting disc of carbon or like material with which a circuit is completed through an electrode on the gage to indicate that the proper size hole has been reached.

Still another object is to provide a gage which can easily and quickly be adjusted between a rough cut position and a finish cut position.

Still another object is to provide a combined gage and tool dresser which will simultaneously dress the grinding wheel itself and the conducting disc associated therewith.

The above and other objects and advantages of the invention will be more readily apparent from the following description when read in connection with the accompanying drawing, in which:

Figure 1 is a partial plan view of a grinder equipped with a gage embodying the invention, with parts broken away and in section.

Figure 2 is a partial section on the line 2—2 of Figure 1.

Figure 3 is a section on the line 3—3 of Figure 2.

Figure 4:
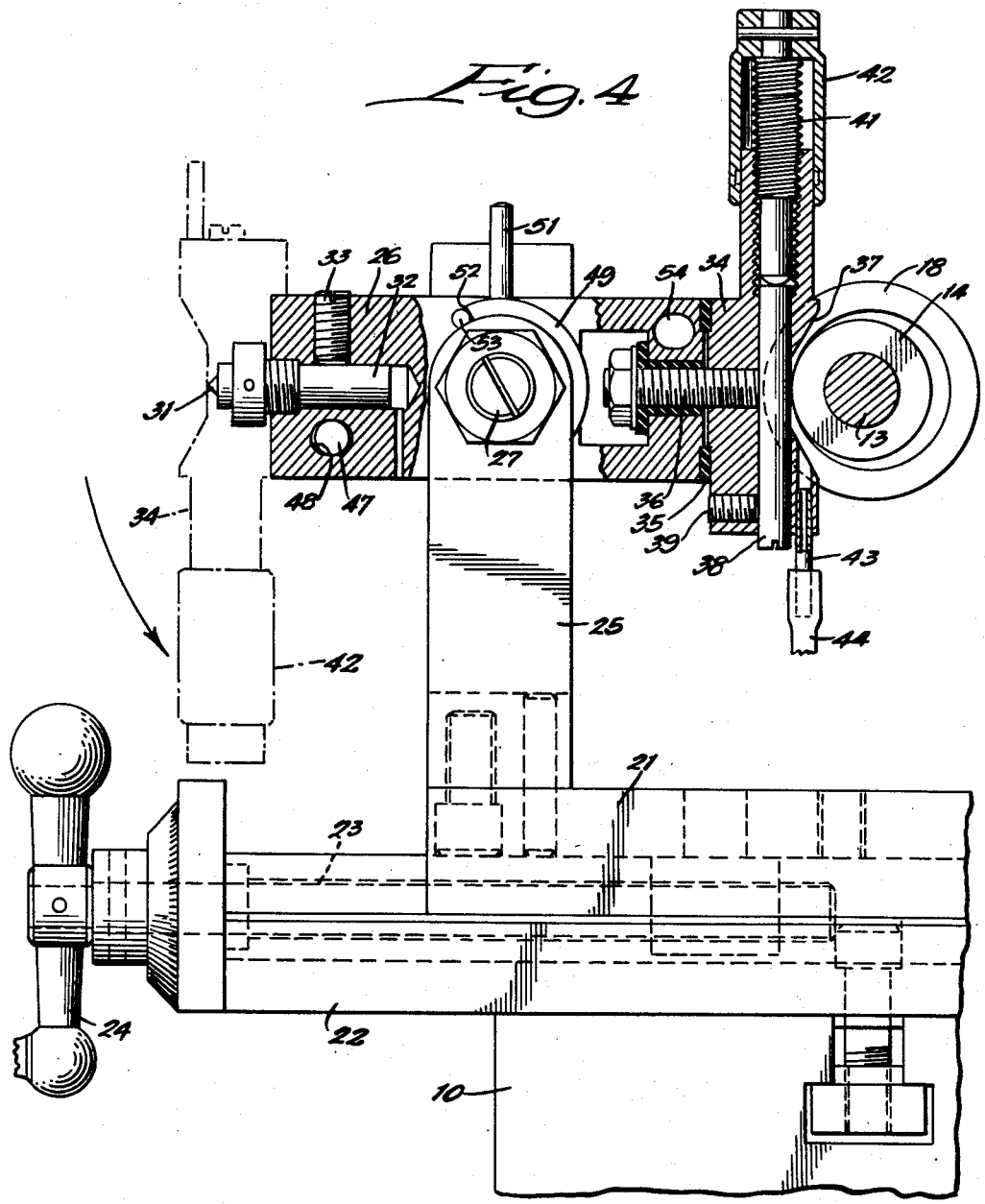
Figure 4 is a section through the gage on the line 4—4 of Figure 1.

As shown in Figure 1, the gage is applied to a grinder having a base or supporting plate 10 carrying a motor 11 which drives a cylindrical grinding wheel 12 through an elongated shaft 13. The grinding wheel 12 may be secured on the shaft in any desired manner, and has associated with it, preferably at its inner end, a disc 14 of conducting material such as carbon or the like, which is circular and has the same radius as the wheel. The disc may be formed integrally with the wheel, if desired, or may be a separate disc

2 fitting on the shaft 13 and held accurately positioned thereon by the wheel.

Opposite and substantially aligned with the shaft 13 is a chuck 15 supported on the frame 10 and driven by a motor 16. The chuck is provided with movable jaws partially shown at 17 to grip a work piece to be internally ground. By way of example the work piece is illustrated as a cylindrical sleeve or collar 18 whose internal surface is to be accurately finished. Either the grinder motor and its associated wheel or the chuck motor and the chuck can be moved longitudinally on the frame to move the wheel into and out of the work piece. The grinder motor 11 is also preferably mounted for transverse movement across the frame to advance the grinder wheel into cutting relation with the side of the work piece so that it will be ground away as desired.

The gage of the present invention comprises a supporting plate 21 mounted on a dovetail on a plate 22, which is secured to the base or frame 10. A screw 23 connects the plate 21 to the base 22, and may be turned through a control handle or crank 24 to shift the gage toward and away from the axis of the grinding wheel if desired.

The base 21 rigidly carries a support 25, shown as having spaced upwardly extending sides. The support 25 pivotally carries an elongated lever 26 which is mounted on the support to swing about a horizontal axis parallel to the axis of the grinder wheel. As shown in Figure 2, the sides of the support carry centers 27, one of which is adjustable to support between them a cylindrical pin 28. The pin 28 is formed at its ends with center bores eccentric to its outer surface, as best seen in Figure 3, so that it is rotatably mounted on the centers 27 on an axis which is eccentric to its cylindrical surface. The lever 26 is rotatably mounted on a bushing 29 on the pin 28 so that it can swing without turning the pin and the pin can turn without swinging the lever.

At one end the lever carries a wheel dresser, illustrated as a diamond point 31. As shown in Figure 4, the diamond point is carried by a shaft 32 which is adjustably mounted in one end of the lever and which may be securely held in adjusted position by a locking screw 33. When the end of the lever carrying the diamond point is swung toward the grinder wheel and is moved axially relatively to the wheel, both the wheel and the disc 14 will be accurately dressed to a true continuous cylindrical surface. Thus the disc and the wheels are always the same size, with the surface of the disc forming a continuation of the wheel surface.

At its opposite end the lever 26 carries a block 34 which is insulated from the lever by an insulating washer 35, and which is secured to the lever by an insulated bolt 36. The block 34 is formed with a cylindrical bore therein transverse to the axis of the wheel and is cut away at one side, as indicated at 37, to expose a portion of the bore. The bore slidably and rotatably receives a conducting rod 38, such as a piece of drill rod, which is frictionally held in position by a set screw 39. The rod 38 may be slotted at one end to receive a screw driver for turning it, and may be moved axially through the bore by a screw 41 threaded in one end of the bore and turned by a cylindrical cap 42 fitting over a cylindrical extension on the block 34. The block 34 may be drilled at one end to receive a short nipple 43 connected to a compressed air hose 44 and directed toward the gap 37 to blow any dust or chips away from the exposed surface of the rod 38 to keep it clean for proper operation.

In use the frame of the machine may be grounded, as, for example, by a wire 45 connected to the motor 11, and a wire 46 forming the other side of the same circuit may be connected to the block 34. With the lever 26 turned as shown in Figures 1 and 4, the exposed portion of the rod 38 is aligned with the disc 14 and the frame 25 may be shifted to the desired position to finish the interior of the sleeve 16 to the desired size. As the motor and grinder wheel are shifted transversely to cut away the interior of the sleeve, a position will finally be reached in which the disc 14 engages the exposed surface of the rod or electrode 38. At this time a circuit will be completed between the leads 45 and 46 to signal the operator that the grinder is now set for the desired hole size.

Preferably the first part of the operation is not completed until the circuit is closed, with the pin 28 turned to a position to shift the lever 26 bodily toward the grinding wheel. Accidental turning of the lever is prevented by a tapered latch pin 47 fitting in a tapered opening 48 in the lever and urged thereinto by a spring. The opening 48 may be slightly elongated horizontally so that the lever 26 can shift toward and away from the grinder wheel but cannot turn. With the parts in this position, when the circuit is completed an indication is given that the desired rough cut has been finished.

To complete the finish cut the pin 28 may be turned to shift the lever 26 bodily away from the grinder wheel by an amount equal to the eccentricity of the pin. For this purpose a collar 49 is secured to the pin and carries an operating finger or arm 51. By swinging the arm 51 to turn the pin, the lever will be bodily shifted an amount equal to the desired finish cut. Preferably the collar 49 is formed with stop shoulders 52 to engage one or more stop pins 53 carried by the support 25 so that the amount through which the pin may be turned is limited, thereby accurately to determine the amount of shifting for the finish cut.

To dress the wheel and the disc 14 the latch pin 47 is pulled back and the lever is swung over so that the wheel dresser 31 is next to the wheel. The lever is held in this position by engagement of the latch pin 47 with a tapered opening 54 in the opposite end of the lever. By shifting the wheel relative to the gage unit, the diamond point 31 will dress the wheel and disc for a subsequent operation or operations.

Preferably the contact rod 38 is shifted slightly at the end of each operation or each series of several operations so that a new surface thereof is exposed to the wheel and disc to provide accurate gaging of the grinding operation. To accomplish this it is necessary only to turn the threaded rod 41 slightly at the end of each operation or series of operations to shift the rod 38 longitudinally. After the rod 38 has been shifted throughout its full length, the rod 41 can be turned back to its original position and the contact rod can be turned slightly with a screw driver or the like and forced back against the end of the rod 41. By repeating this operation the entire surface of the rod 38 can be used so that very accurate gaging can be accomplished without requiring excessive replacement of contact rods.

While one embodiment of the invention has been shown and described in detail, it will be understood that this is illustrative only and is not to be taken as a definition of the scope of the invention, reference being had for this purpose to the appended claims.

What is claimed is:

1. A grinder gage comprising combination with a rotatable grinder wheel having a conducting portion, a support, a member on the support extending toward the wheel, means at the end of the member formed with a bore transverse to the axis of the wheel and tangent to the surface of the wheel, said means being cut away at the side of the bore adjacent to the wheel, and a rod of conducting material slidably and rotatably mounted in the bore to engage a conducting portion of the wheel through the cut away portion of said means.

2. A grinder gage for use with a grinder wheel having a conducting portion comprising a support, a member on the support extending toward a grinding wheel, means at the end of the member formed with a bore transverse to the axis of the wheel, said means being cut away at the side of the bore adjacent to the wheel, a rod of conducting material slidably and rotatably mounted in the bore to engage a conducting portion of the wheel through the cut away portion of said means and a gas discharge nozzle carried by said means and directed toward the cut away portion thereof.

3. A grinder gage comprising in combination with a rotatable grinder wheel having a conducting portion, a support, a member on the support extending toward the wheel, means at the end of the member formed with a bore transverse to the axis of the wheel and tangent to the surface of the wheel, said means being cut away at the side of the bore adjacent to the wheel, and a rod of conducting material slidably and rotatably mounted in the bore to engage a conducting portion of the wheel through the cut away portion of said means and means mounting the member on the support for limited movement toward and away from the wheel.

4. A grinder gage comprising in combination with a rotatable grinder wheel having a conducting portion, a support, a member on the support extending toward the wheel, a block carried by and insulated from the end of the member and formed with a bore transverse to the axis of the wheel and tangent to the surface of the wheel, and a conducting rod slidably and rotatably mounted in the bore, the block being cut away at its outer end to expose the rod for contact with a conducting part of the wheel.

5. A grinder gage for use with a grinder wheel having a conducting portion comprising a support, a cylindrical pin rotatably mounted on the support on an axis eccentric to its surface, a lever rotatably mounted on the pin and extending toward the wheel, means to hold the lever against turning relative to the support, means to turn the pin thereby to move the end of the lever toward and away from the wheel, and an electrode carried by the end of the lever to engage a conducting portion of the wheel.

6. A grinder gage for use with a grinder wheel having a conducting portion comprising a support, a cylindrical pin rotatably mounted on the support on an axis eccentric to its surface, a lever rotatably mounted on the pin and extending toward the wheel, means to hold the lever against turning relative to the support, means to turn the pin thereby to move the end of the lever toward and away from the wheel, means at the end of the lever adjacent to the wheel formed with a bore transverse to the wheel axis, and a conducting rod slidable and rotatable in the bore, said means being cut away at the outer end of the lever to expose the rod for engagement with a conducting part of the wheel.

7. A grinder gage for use with a grinder wheel having a conducting portion comprising a support, a cylindrical pin rotatably mounted on the support on an axis eccentric to its surface, an elongated lever rotatably mounted at its center on the pin, latch means on the support to hold the lever in either of two reversed positions in which its opposite ends extend toward the wheel, means to turn the pin thereby to shift the lever bodily toward and away from the wheel, a wheel dresser on one end of the lever to dress the wheel, and an electrode on the other end of the lever to engage a conducting portion of the wheel.

8. In combination with a cylindrical grinding wheel, a disc of conducting material secured to the wheel, a support mounted adjacent to the wheel, a member carried by and insulated from the support, and having a bore therein transverse to the wheel axis and tangent to the surface of the wheel, and a conducting rod slidable and rotatable in the bore, the end of the member being cut away to expose the rod for engagement with the disc.

9. In combination with a cylindrical grinding wheel, a disc of conducting material securing to the wheel and coextensive in diameter therewith, a support mounted adjacent to the wheel, a lever pivoted on the support to swing to positions in which its opposite ends extend toward the wheel, a wheel dresser on one end of the lever simultaneously to dress the edges of the wheel and the disc to a smooth continuous cylindrical surface, and an electrode on the other end of the lever to engage the disc, and an indicating circuit connected to the electrode.

10. In combination with a cylindrical grinding wheel, a disc of conducting material secured to the wheel, a support mounted adjacent to the wheel, a cylindrical pin rotatably mounted on the support on an axis eccentric to its surface, an elongated lever rotatably mounted at its center on the pin, latch means to hold the lever in either of two reversed positions in which its opposite ends extend toward the wheel, means to turn the pin thereby to shift the lever bodily toward and away from the wheel, a wheel dresser on one end of the lever simultaneously to dress the wheel and disc, and an electrode on the other end of the lever to engage the disc.

PRENTICE H. CONRADSON.

References Cited in the file of this patent

UNITED STATES PATENTS

| Number | Name | Date |
|---|---|---|
| 1,872,667 | Bryant | Aug. 23, 1932 |
| 1,877,505 | Haas et al. | Sept. 13, 1932 |
| 2,050,261 | Blood | Aug. 11, 1936 |
| 2,206,732 | Schmidt et al. | July 2, 1940 |
| 2,212,511 | Conradson | Aug. 27, 1940 |
| 2,326,339 | Dudgeon | Aug. 10, 1943 |
| 2,394,475 | Pierce | Feb. 5, 1946 |